United States Patent [19]

Putnam, deceased et al.

[11] Patent Number: 4,568,425
[45] Date of Patent: Feb. 4, 1986

[54] PYROLYSIS MACHINE AND PROCESS

[76] Inventors: Gilbert D. Putnam, deceased, late of Buffalo County, Nebr.; by Bryan L. Putnam, executor, P.O. Box 165, Kearney, Nebr. 68847

[21] Appl. No.: 613,312

[22] Filed: May 23, 1984

[51] Int. Cl.⁴ .................. C10B 1/06; C10B 51/00; C10B 57/10
[52] U.S. Cl. .................. 202/108; 110/224; 110/227; 110/228; 202/109; 202/117; 202/118; 202/137; 432/223
[58] Field of Search .............. 202/108, 109, 114, 116, 202/117, 118, 135, 137, 265; 201/14–16, 25, 26, 29, 33, 21; 48/111; 110/203, 204, 216, 218, 219, 224, 225, 226, 227, 228, 232, 243, 106; 432/222, 223

[56] References Cited

U.S. PATENT DOCUMENTS

| | | | |
|---|---|---|---|
| 1,459,302 | 6/1923 | Hermann | 110/226 |
| 1,490,213 | 4/1924 | Jenson | 202/137 |
| 1,604,253 | 10/1926 | Barnhart | 202/118 |
| 1,796,100 | 3/1931 | Heller | 201/33 |
| 2,040,270 | 5/1936 | Pool | 48/111 |
| 2,069,421 | 2/1937 | Salerni | 202/117 |
| 2,151,320 | 3/1939 | Forni | 110/226 |
| 3,020,212 | 2/1962 | Lantz | 202/118 |
| 3,110,652 | 11/1963 | Thomsen | 202/118 |
| 4,308,034 | 12/1981 | Hoang | 202/117 |

FOREIGN PATENT DOCUMENTS

| | | | |
|---|---|---|---|
| 749141 | 1/1932 | France | 110/227 |
| 36841 | 11/1935 | Netherlands | 110/227 |

Primary Examiner—Jay H. Woo
Assistant Examiner—Joye L. Woodard
Attorney, Agent, or Firm—Kokjer, Kircher, Bradley, Wharton, Bowman & Johnson

[57] ABSTRACT

A pyrolysis unit in which feed materials containing cellulose or oil are subjected to destructive heating to drive off gases and liquid vapors while leaving solid residue in the form of nearly pure carbon. The feed materials are conveyed in succession through horizontal reaction cylinders located at different elevations. Heat is applied by the burning of solid fuel in a firebox of the unit and also by injecting into each cylinder the process gas driven off in the immediately succeeding cylinder. A feeder which delivers both the fuel and feed materials includes drying zones in which combustion gases are directed through the fuel and feed materials to preheat and dry them and to filter the combustion gases.

15 Claims, 9 Drawing Figures

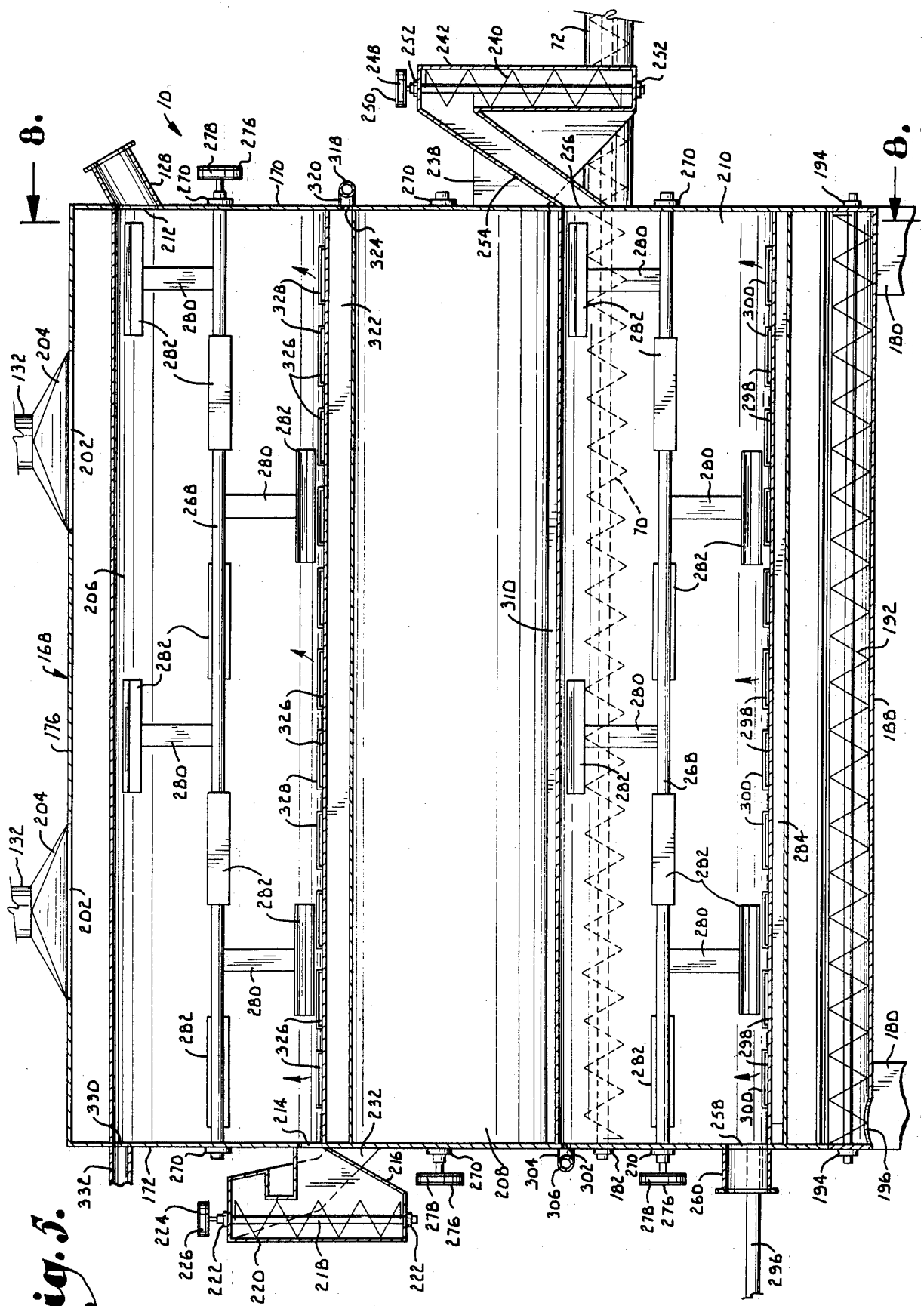

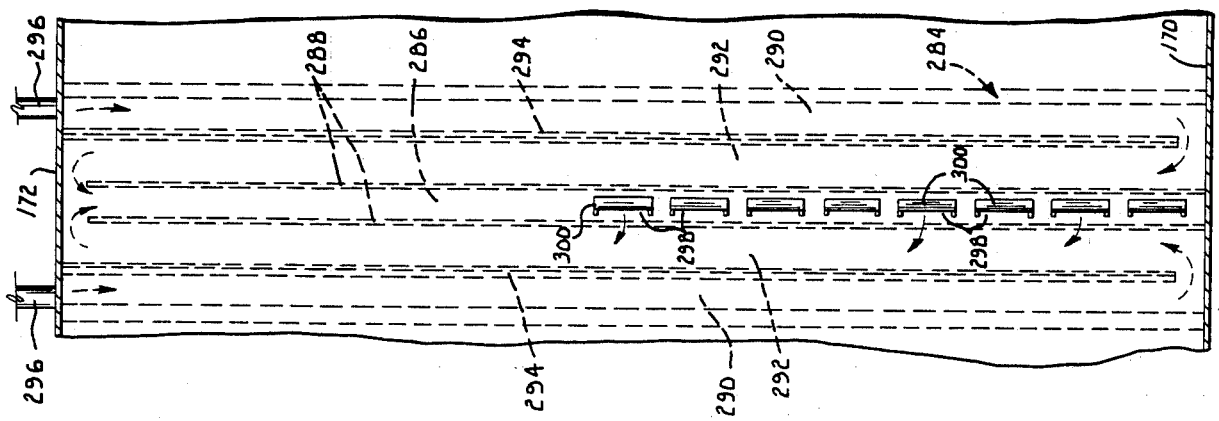
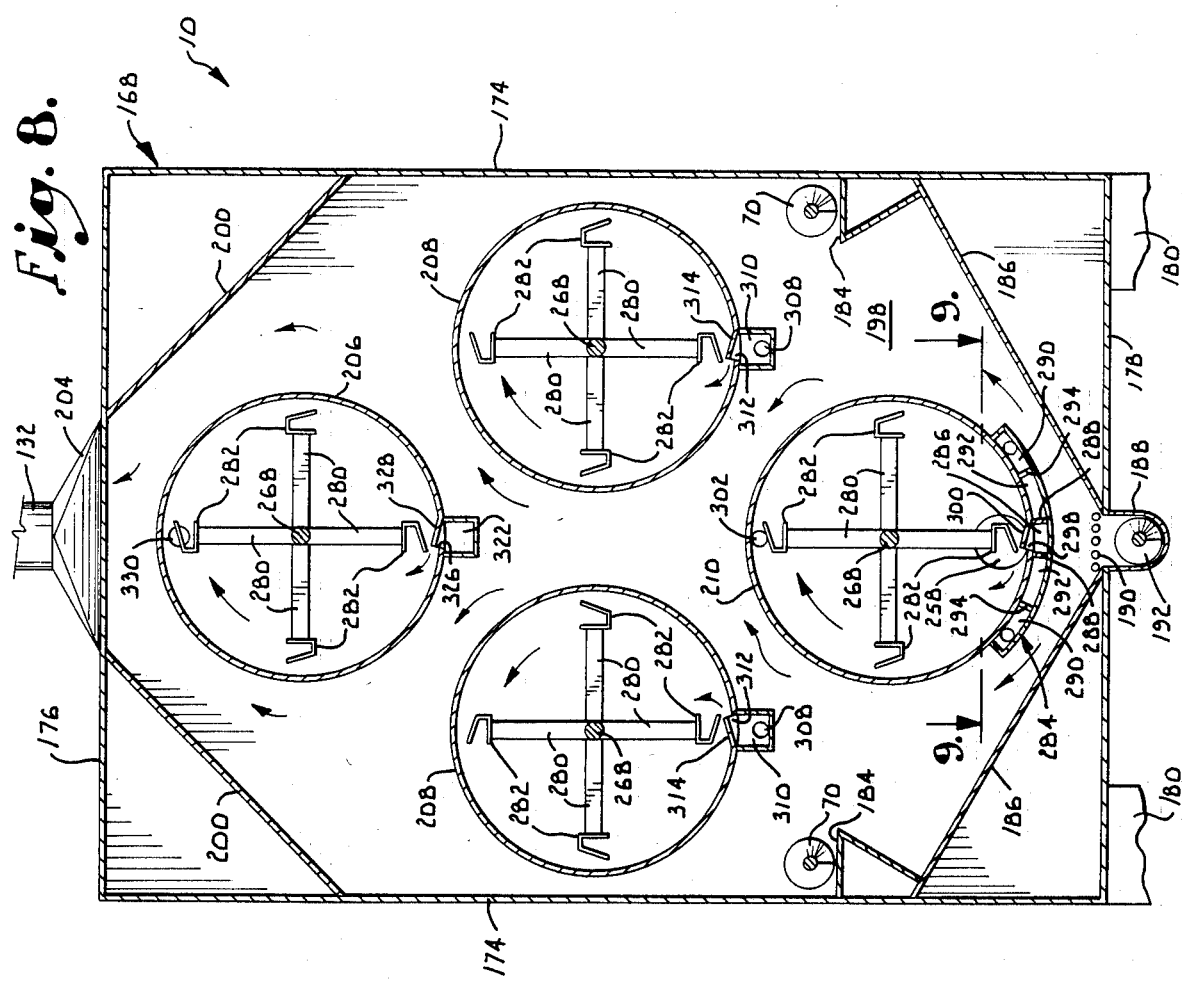

PYROLYSIS MACHINE AND PROCESS

BACKGROUND AND SUMMARY OF THE INVENTION

This invention relates to the pyrolytic treatment of materials containing cellulose or oil in a manner to produce solid carbon and useful gases and vapors. More particularly, the invention is directed to an improved method and apparatus for carrying out the pyrolysis.

As disclosed in U.S. Pat. Nos. 4,123,332 and 4,308,103 to Rotter, the pyrolytic treatment of carbonizable materials such as saw dust, scrap tires and municipal wastes has been proposed. The pyrolysis process consists of heating the feed materials in order to drive off and recover gases such as methane and hydrocarbon vapors while leaving solid carbon materials which are also recovered. The primary problem with the machines and processes that have been proposed in the past is their inefficiency. In order to heat the feed materials sufficiently to produce end products having acceptable purity, it is necessary to burn an excessive amount of fuel. Consequently, the overall process has not been practical from an economic standpoint. Handling of the combustion gases has also been a problem.

The present invention provides an improved pyrolysis process and improved equipment which eliminates much of the inefficiency associated with the processes and machines that have been proposed in the past. In accordance with the invention, a multiple stage pyrolysis unit is equipped with a plurality of reaction cylinders which are arranged at different levels and which receive the carbonizable materials in succession. Solid fuel is burned in a firebox of the unit to heat the reaction cylinders and their contents. The arrangement of the successive reaction cylinders at different levels enhances the thoroughness and uniformity with which the feed materials are heated to create efficiencies that have not heretofore been achieved.

Additionally, the process gas which is produced in each reaction cylinder is passed through the carbonizable materials in the preceding cylinders, thereby further heating the materials and improving the efficiency of the heat utilization. The feed materials are agitated as they are conveyed through the reaction cylinders so that the process gas can intimately contact and transfer heat to the materials. The process gas is heated in manifolds which underlie the cylinders and is injected into each cylinder through a series of slots which distribute the gas uniformly in the cylinder. Baffles which overlie the slots deflect the solid carbonizable materials away from the slots to prevent the solids from passing through the slots into the gas manifolds.

A further important feature of the invention is the provision of a unique feeder unit which feeds both the fuel and the carbonizable material to the pyrolysis unit. In the feeder, the hot combustion gases that result from burning of the fuel are passed through both the incoming fuel and the incoming feed materials. This both dries and preheats the incoming materials an also filters the exhaust gases prior to their discharge. In the drying zones of the heater, unique inclined surfaces are provided with baffled openings to permit the combustion gases to thoroughly and intimately contact the fuel and feed material. The fuel is also passed through a drying cylinder in which the combustion gases are applied to the fuel as it is being conveyed through the drying cylinder and simultaneously agitated.

The physical configuration of the pyrolysis unit and the improved manner in which heat is transferred to the feed materials creates efficiencies that make the pyrolysis process economically feasible. At the same time, the process produces substantially pure carbon and permits the recovery and use of virtually all recoverable gases and vapors while discharging relatively clean exhaust gases.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 5 is an enlarged sectional view of the pyrolysis unit taken on a vertical plane passing through the longitudinal axis of the pyrolysis unit;

FIG. 8 is a sectional view taken generally along line 8—8 of FIG. 5 in the direction of the arrows; and FIG. 9 is a fragmentary sectional view taken generally along line 9—9 of FIG. 8 in the direction of the arrows.

DETAILED DESCRIPTION OF THE INVENTION

Figure 1:
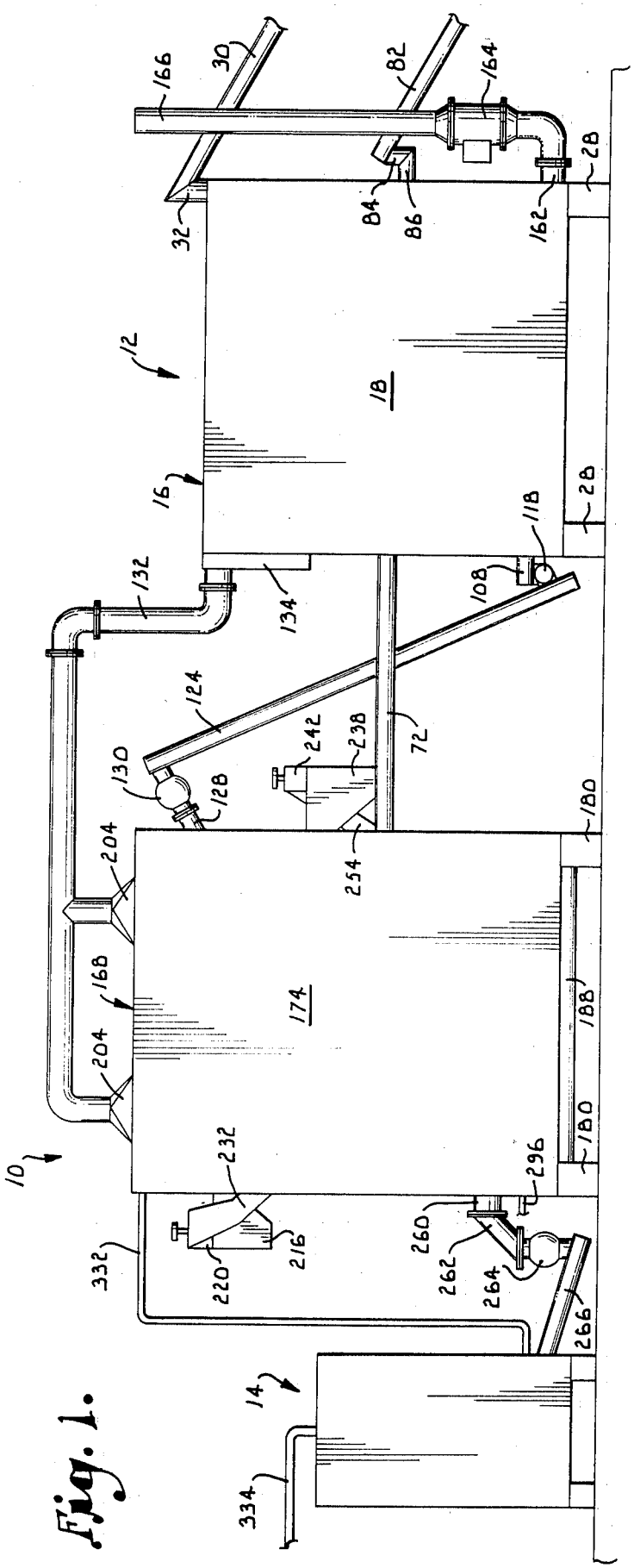
FIG. 1 is a side elevational view of a pyrolysis unit, feeder unit and condensor connected with one another in accordance with a preferred embodiment of the present invention.

Referring initially to FIG. 1, the present invention is directed to a method and apparatus for the pyrolytic treatment of virtually any carbonizable feed material containing cellulose or oil. By way of example, the feed materials which can be processed in accordance with the present invention include saw dust, wood chips, wood waste, municipal waste, tires, ensilage, wild hay, manure, corn stalks, various types of farm products, and other material having a significant cellulose or oil content. The pyrolytic treatment is carried out in a pyrolysis unit which is generally designated by reference numeral 10. The carbonizable materials which are subjected to destructive heat in the pyrolysis unit 10 and the solid fuel which is burned therein are delivered from a feeder unit generally designated by numeral 12. Reference numeral 14 generally identifies a condensor in which water and tar are removed from the process gas produced by the pyrolytic treatment.

Figure 2:
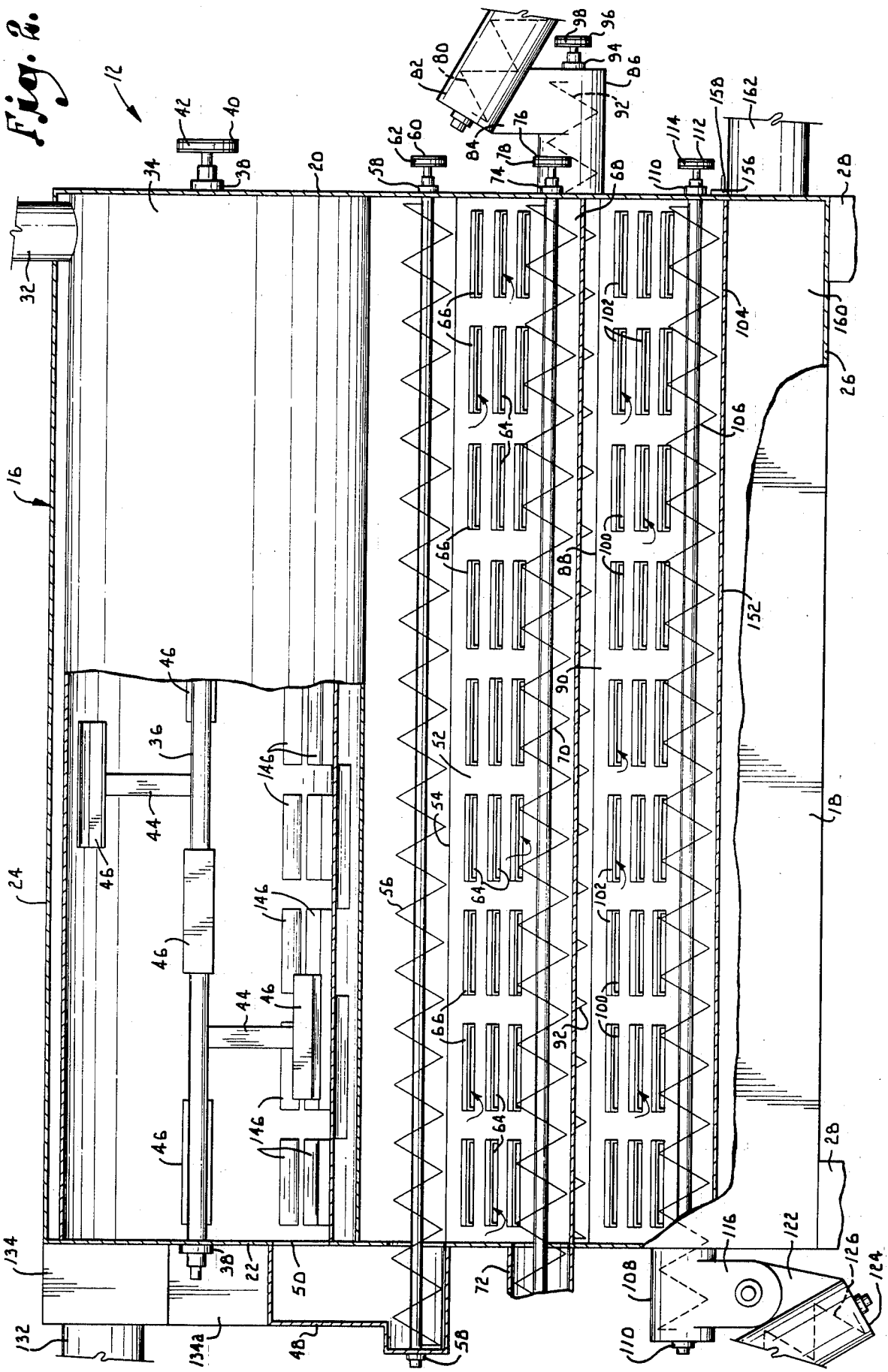
FIG. 2 is a fragmentary side elevational view of the feeder unit on an enlarged scale, with portions broken away for purposes of illustration.
Figure 4:
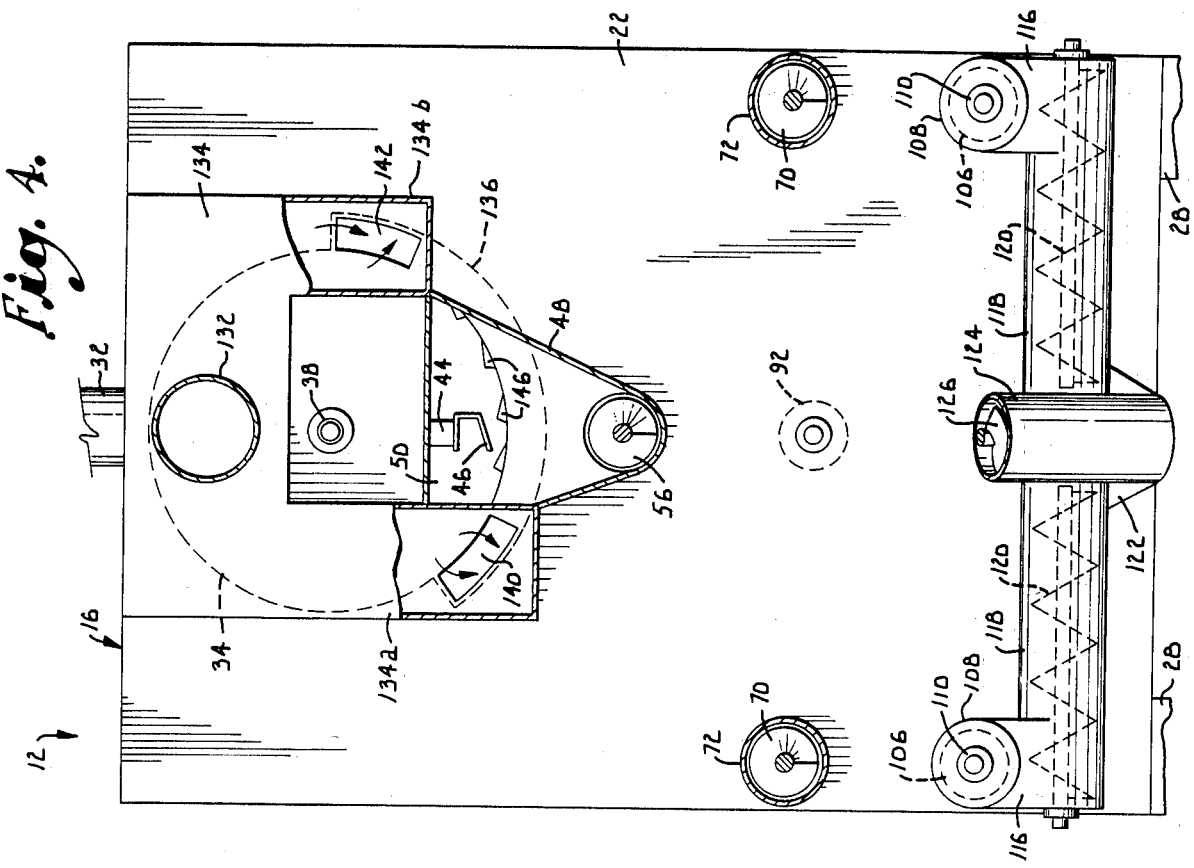
FIG. 4 is an end elevational view of the feeder unit taken from the left end as viewed in FIG. 2, with portions broken away for purposes of illustration.
Figure 3:
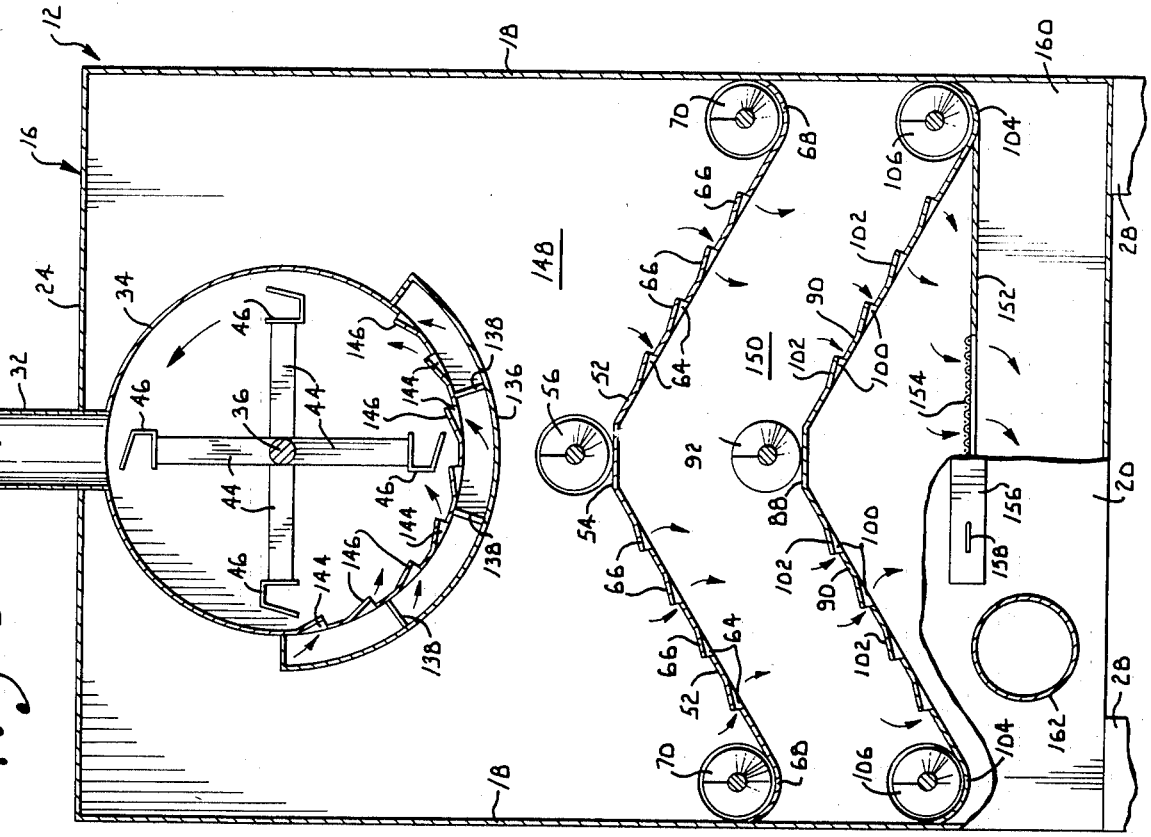
FIG. 3 is an end elevational view of the feeder unit taken from the right end as viewed in FIG. 2, with portions broken away for purposes of illustration.

The details of the feeder 12 are best illustrated in FIGS. 2-4. The feeder has a rectangular, box-like housing 16 formed by opposite side panels 18, opposite end panels 20 and 22, a top panel 24, and a bottom panel 26. The feeder housing 16 is formed from a heat resistant metal and is supported on a plurality of legs 28 secured to the bottom panel 26.

The solid fuel which is burned in the pyrolysis unit 10 may be wood, coal or any other material suitable to serve as the fuel. The fuel is held in a container such as a large hopper (not shown) and is delivered from the hopper to the feeder 12 through an inclined conduit 30 (see FIG. 1). A conventional auger (not shown) operates in the conduit 30 to convey the fuel upwardly in the conduit and to then discharge the fuel into a vertical inlet conduit 32 which admits the fuel into the feeder housing 16.

The fuel inlet conduit 32 connects with one end of a horizontal fuel drying cylinder 34 which extends between the end walls 20 and 22 of the feeder housing 16. The drying cylinder 34 is located near the top panel 24 of the feeder housing and has its inlet end located adjacent to end wall 20. A horizontal shaft 36 extends axially through the center of cylinder 34 and is supported for rotation by bearings 38 on the end walls 20 and 22. Shaft 36 carries a pulley 40 on one end, and the pulley is rotated by a belt 42 which is in turn driven by a motor such as a hydraulic motor (not shown).

The fuel is conveyed through the drying cylinder 34 by a series of paddles or vanes having arms 44 which extend generally radially from shaft 36. The arms 44 are spaced around and along the length of shaft 36 and carry open buckets 46 on their outer ends. The arrangement of the buckets 46 is such that they move adjacent to the inside surface of cylinder 34 and convey the fuel along the length of the drying 34 while simultaneously agitating the fuel. The buckets 46 pick up the fuel near the bottom of the cylinder and drop it as the bucket passes the top dead center position, as best shown in FIG. 3. The padding action of the arms and the movement of the buckets conveys the fuel lengthwise in the cylinder 34 while creating substantial agitation as the fuel is picked up and dropped from the buckets.

The outlet end of the drying cylinder 34 is located adjacent to the opposite end wall 22. At the outlet end, the fuel is discharged from cylinder 34 into a hopper 48 having side walls which converge as they extend downwardly as best shown in FIG. 4. An outlet opening 50 provides a discharge passage which connects the outlet end of cylinder 34 with the hopper 48.

A drying surface for the fuel which generally underlies the drying cylinder 34 is formed by a pair of inclined panels 52 which extend between the end walls 20 and 22. As best shown in FIG. 3, a horizontal surface 54 forms a crest at the upper end of each inclined panel 52 at the same level as the bottom of the hopper 48. Panels 52 slope outwardly and downwardly from the opposite sides of surface 54. A leveling auger 56 having a spiral vane extends from hopper 48 and along the horizontal surface 54. The auger 56 is supported for rotation by bearings 58 on the hopper 48 and wall 20. The auger 56 carries a pulley 60 on one end which is driven by a belt 62. A motor such as a hydraulic motor (not shown) drives belt 62 in order to rotate the auger 56.

Each inclined panel 52 is provided with a series of slots 64 through which combustion gases can flow, as will be explained more fully. The slots 64 are arranged uniformly along both the length and width of each panel 52. Overlying each slot 64 is a rigid baffle 66 which is oriented to prevent the solid fuel from entering the underlying slot 64. In other words, the openings presented by the slots 64 face generally downwardly so that solid fuel materials passing downwardly along the inclined panels 52 are deflected by baffles 66 in a manner to prevent the solid fuel from entering the slots.

A trough 68 extends along each side panel 18 of the feeder housing on the lower outer end of each inclined panel 52. Each trough 68 is equipped with a transfer auger 70 which transfers the fuel along the corresponding trough 68 and into and through a generally horizontal conduit 72. The transfer augers 70 convey the fuel through the two parallel conduits 72 and into the pyrolysis unit 10. Each of the transfer augers 70 is supported for rotation by a bearing 74 on end panel 20. Pulleys 76 carried on the ends of the transfer augers are driven by belts 78 which are in turn driven by motors such as hydraulic motors (not shown) to operate the transfer augers.

The carbonizable materials which are processed in accordance with the present invention are contained in a hopper (not shown) or a similar container and are discharged therefrom by an auger 80 operating in an inclined conduit 82 having its lower end connected with the hopper. The auger 80 elevates the feed materials in conduit 82 and discharges them into a short vertical conduit 84 having its lower end connected with a horizontal conduit 86 which forms an inlet conduit for introducing the carbonizable materials into the feeder housing 16. The inlet conduit 86 extends through end wall 20 to deliver the incoming feed materials onto a horizontal surface 88. Surface 88 forms part of a drying surface for the carbonizable materials, and the drying surface also includes a pair of inclined panels 90 which extend downwardly and outwardly from opposite sides of the surface 88. The drying surface extends the entire length of the feeder housing 16 between the end walls 20 and 22 with the horizontal surface 88 located at the crest of each inclined panel 90. The material drying surface formed by panels 88 and 90 is located below the fuel drying surface formed by panels 52 and 54, as best shown in FIG. 3.

A leveling auger 92 has one end located in the inlet conduit 86 and extends generally along the horizontal surface 88 in order to distribute the carbonizable materials thereon. The leveling auger 92 is supported for rotation by a pair of bearings 94 and carries a pulley 96 on one end. Pulley 96 is driven by a belt 98 which is in turn driven by a motor such as a hydraulic motor (not shown) to operate the auger.

Panels 90 are each provided with a series of slots 100 each having an overlying baffle 102. The slots are located uniformly along the lengths and widths of the panels. Combustion gases are able to freely pass through the slots 100, while the baffles 102 deflect the carbonizable materials on panels 80 in much the same manner described in connection with baffles 66. Thus, the solid materials on the panels 90 are prevented from passing through the slots 100, although the combustion gases can pass through the slots and through the materials located on the inclined panels 90.

A trough 104 extends along each side panel 18 of the housing at the lower end of each inclined panel 90. A transfer auger 106 operates in each trough 104 to convey the carbonizable materials along the trough and into a pair of outlet conduits 108 which intersect with the troughs 104 at end wall 22. Each transfer auger 106 is supported for rotation by a pair of bearings 110 located on panel 20 and the closed end of conduit 108. One end of each auger 106 carries a pulley 112 driven by a belt 114. The belts are driven by hydraulic motors (not shown) in order to operate the augers.

As best shown in FIG. 4, the transfer augers 106 deliver the carbonizable materials into the outlet conduits 108 which connect with short vertical conduits 116. Horizontal conduits 118 extend transversely generally along end wall 22 and connect at their outer ends with the vertical conduits 116 in order to receive the process materials therefrom. Augers 120 which operate in the transverse conduits 118 convey the materials inwardly to a central hopper 122 which connects with the lower end of an inclined conduit 124. The materials are conveyed from hopper 122 through the inclined conduit 124 by an auger 126 which operates in the inclined conduit.

As shown in FIG. 1, the upper end of the inclined conduit 126 connects with a downwardly inclined conduit 128 which introduces the carbonizable materials into the pyrolysis unit 10. Conduit 128 is equipped with a rotary air lock valve 130. Auger 126 maintains conduit 128 filled with material above the valve 130 in order to prevent air from entering the pyrolysis unit 10 through the inlet conduit 128. The air lock valve 30 operates in a well known manner to further assure that air will not enter through the inlet conduit 128.

The combustion gases resulting from the burning of fuel in the pyrolysis unit 10 are exhausted from the pyrolysis unit through an exhaust conduit 132 which leads to connection with an enclosed box 134 mounted on end panel 22 of the feeder housing. As best shown in FIG. 4, the box 134 has two spaced apart leg portions 134a and 134b which extend generally downwardly from the body portion of the box. The legs 134a and 134b serve as flow splitters which split the combusion gas flow into separate streams, one of which passes through leg portion 134a and the other of which passes through the other leg portion 134b.

The combustion gases flow from box 134 into a generally arcuate manifold 136 mounted to the fuel drying cylinder 34 in extension along its underside. As best shown in FIG. 3, the interior of manifold 136 is provided with baffles 138 which divide the manifold into four compartments of substantially equal size. Referring now again to FIG. 4, one of the manifold compartments has an open end forming an inlet 140 which admits the combustion gases from leg portion 134a into the manifold. Another compartment on the opposite side of the manifold has an open end forming another inlet 142 which admits combustion gases from the other leg portion 134b into the manifold. The baffles 138 are arranged to distribute the combustion gases in substantially equal quantities in all of the manifold compartments.

A series of baffled slots 144 direct the combustion gases from the interior of the manifold 136 into the drying cylinder 34. The slots 144 are distributed uniformly along the length of the drying cylinder and uniformly along each of the manifold compartments. Each slot 144 is provided with an overlying baffle 146 which serves to deflect the solid fuel in cylinder 34 such that the fuel is inhibited from passing through the slots 144. The baffles 146 are arranged such that the slots 144 face in the same direction as the adjacent buckets 146. Thus, the combustion gases are able to pass through the slots 144 while the solid fuel in the drying cylinder is prevented from entering the slots.

The combustion gases serve to dry the fuel in a fuel drying zone 148 which is formed in the feeder housing 16 above the fuel drying surface formed by panels 52 and 54. The carbonizable materials which pass along the lower pair of inclined panels 90 are dried by the combustion gases in another drying zone 150 defined between the upper and lower sets of inclined panels 52 and 90, respectively.

A horizontal panel 152 extends between the end panels 20 and 22 of the feeder housing and between the lower troughs 104. Panel 152 is imperforate except for a filter 154 which may be formed by a screen carrying carbon which filters the exhaust gases. The filter 154 is carried on a tray 156 having one or more handles 158 accessible from the exterior of the feeder housing 16. Preferably, the tray 156 and handles 158 are located adjacent to the end panel 20 so that the tray can be pulled out of the unit for replacement or servicing of the filter 154.

Underlying panel 152 is a compartment 160 which receives all of the combustion gases after they have passed through the drying zones 148 and 150 and through the filter 154. Extending from compartment 160 is an exhaust conduit 162 equipped with a fan 164 (FIG. 1) which operates to draw the combustion gases from the pyrolysis unit 10 through the feeder unit 12. The downstream side of the fan 84 connects with an exhaust stack 166 through which the exhaust gases are discharged.

The details of the pyrolysis unit 10 are best shown in FIGS. 5-8. The pyrolysis unit has a box-like housing 168 formed by opposite end panels 170 and 172, opposite side panels 174, a top panel 176 and a bottom panel 178. The housing 168 is supported on a plurality of legs 180 which connect with the bottom panel 178. The pyrolysis unit 10 is preferably located near the feeder 12 in order to receive materials therefrom. The housing 168 can be surrounded by an outer shell (not shown), and the space between the housing and shell may be insulated or it may be used as source of heated air that can be used for the drying of grain or in another useful manner.

The transfer conduits 72 provide inlets through which the solid fuel enters housing 168. The fuel is conveyed through conduits 72 by the transfer augers 70 which extend through end panel 170 and are supported by bearings 182 on the opposite end panel 172. The augers 70 extend along horizontal panels 184 (see FIG. 8) which project inwardly from the opposite side panels 174 of housing 168. The fuel which is distributed along panels 184 by augers 70 drops off of the panels 184 and onto inclined surfaces 186 which incline downwardly and inwardly from panels 174 and connect at their lower ends with the bottom panel 178 near the center line of housing 168.

Located between the lower ends of panels 186 is an ash trough 188 having an overlying grate 190 which prevents the fuel from entering the ash trough but which permits ashes to drop into the trough. The ashes are conveyed along trough 188 by a horizontal auger 192 which is supported by bearings 194 on the end panels 170 and 172. Auger 192 can be driven in any suitable manner, and its operation can be controlled by a control system which controls the handling of the ashes. As shown in FIG. 5, the ash trough 188 has an outlet opening 196 at the end adjacent panel 172. The ashes which reach the outlet opening 196 drop out of the ash trough and can be carried away and disposed of by any suitable conveyor system or other ash handling equipment (not shown).

The fuel which is delivered into housing 168 is burned therein in a firebox 198 defined between the opposite side walls 174 and above the inclined panels 186 and below another pair of inclined panels 200 which extend the length of housing 168 and which angle upwardly and inwardly from the side panels 174 to connection with the top panel 176. The combustion gases resulting from the burning of fuel in the firebox 198 are exhausted from housing 168 through a pair of outlets 202 (FIG. 5) which are formed in the top panel 176 and which are each equipped with a hood 204. The hoods direct the combustion gases into the exhaust conduit 132.

The pyrolysis unit 10 is a multiple stage machine having a single upper reaction cylinder 206, a pair of side by side intermediate reaction cylinders 208 and a single lower reaction cylinder 210. Each reaction cylinder is oriented horizontally and extends between the end panels 170 and 172 within the firebox 198. The cylinders are all parallel to one another. The upper reaction vessel or cylinder 206 forms the first stage of the apparatus and is located at a level above the two intermediate cylinders 208 which form the intermediate stage. The lower vessel 210 is located at a level below the intermediate cylinders and forms the third and final stage.

As best shown in FIG. 5, the inlet conduit 128 leads to an inlet opening 212 which admits the carbonizable material into the inlet end of the upper reaction cylinder 206. The inlet opening 212 is formed in end panel 170. The opposite or outlet end of the upper cylinder 206 is provided with an outlet 214 through which the materials are discharged from cylinder 206 into a hopper 216 mounted on end panel 172.

Figure 7:
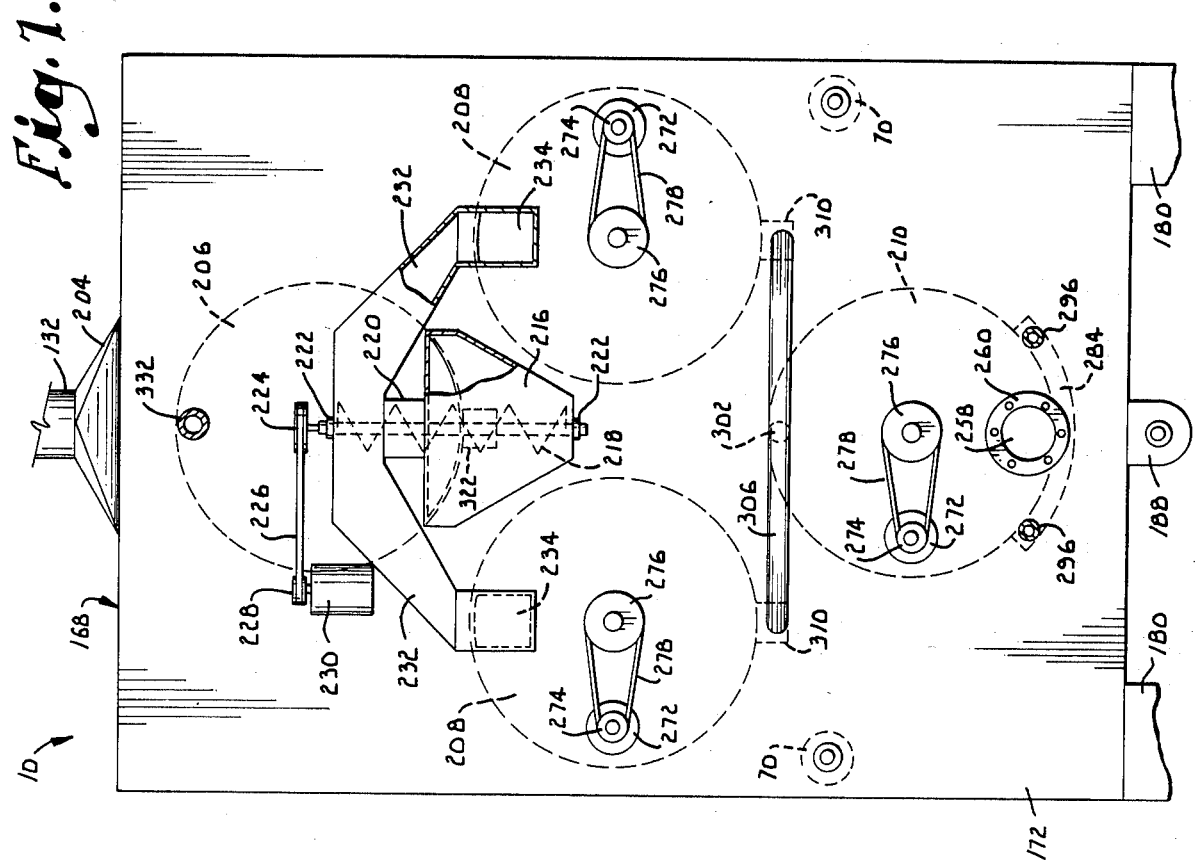
FIG. 7 is an end elevational view of the pyrolysis unit taken from the left end as viewed in FIG. 5, with portions broken away for purposes of illustration.

As best shown in FIG. 7, the sides of the hopper 216 are inclined and converge toward the bottom of the hopper. Extending upwardly in hopper 216 is a vertical auger 218 which conveys the materials upwardly in the hopper and through a short vertical conduit 220. The auger 218 is supported for rotation by bearings 222 and carries a pulley 224 on its upper end. Pulley 224 is driven by a belt 226 which is drawn around another pulley 228 carried on the output shaft of a hydraulic motor 230. The motor 230 thus drives auger 218 through the belt and pulley drive system.

With continued reference to FIG. 7 in particular, a pair of inclined chutes 232 have their upper ends connected with the top end of conduit 220 and incline downwardly in opposite directions from the top end of conduit 220. The lower ends of the chutes 232 connect with inlets 234 which extend through end panel 172 and deliver material into the two intermediate reaction vessels 208 in substantially equal amounts. The opposite or outlet ends of the intermediate cylinders 208 are provided with outlets 236 (see FIG. 6) through which material is discharged from the intermediate cylinders into a hopper 238 mounted on end panel 170. The outlets 236 extend through panel 170.

Figure 6:
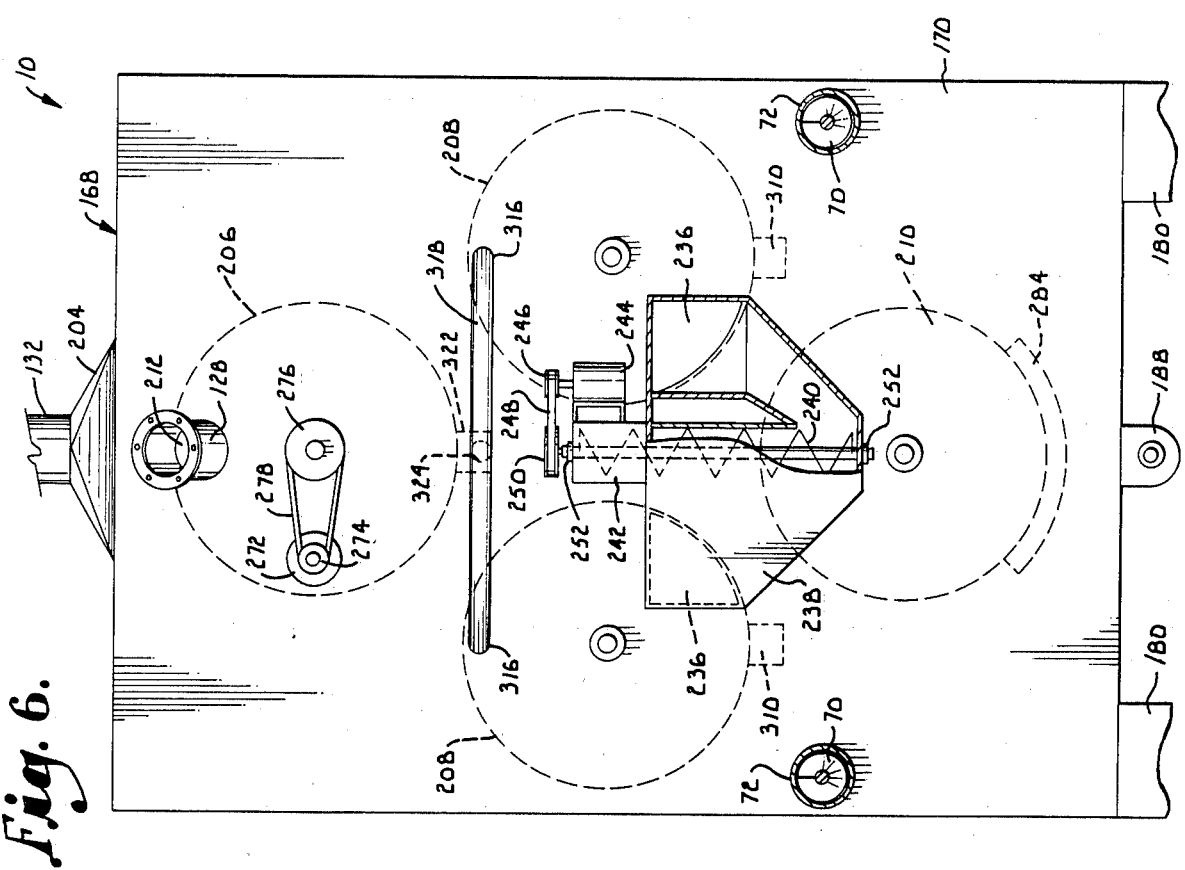
FIG. 6 is an end elevational view of the pyrolysis unit taken from the right end as viewed in FIG. 5, with portions broken away for purposes of illustration.

As best shown in FIG. 6, the opposite sides of hopper 238 are inclined and converge as they extend downwardly toward the bottom of the hopper. A vertical auger 240 operates in the hopper 238 and also in a short vertical conduit 242 which extends upwardly out of the hopper. The auger 240 is driven by a hydraulic motor 244 in order to convey materials from hopper 238 to the top end of conduit 242. The drive system includes a pulley 246 on the output shaft of motor 244 and a drive belt 248 which is drawn around pulley 246 and around another pulley 250 carried on the upper end of the auger 240. Bearings 252 support the auger for rotation.

Referring now to FIG. 5 in particular, the top end of conduit 242 connects with the top end of an inclined chute 254 which connects at its lower end with a material inlet 256 to the lower reaction cylinder 210. Inlet 256 is formed through end panel 170 and admits the carbonizable materials to the inlet end of the lower cylinder 210. The opposite or outlet end of cylinder 210 is provided with an outlet opening 258 which extends through end panel 172 and connects with an outlet conduit 260. As shown in FIG. 1, conduit 260 connects with an inclined conduit 262. The lower end of conduit 262 is equipped with a rotary air lock valve 264. The opposite or lower side of valve 264 connects with one end of an inclined conduit 266. The conduit 266 may be provided with an auger or other conveying means (not shown) which delivers the solid carbon materials resulting from the pyrloysis process to a solid recovery system (not shown). The air lock valve 264 operates to prevent air from back flowing into the reaction cylinders within the pyrolysis unit 10.

The feed materials are conveyed longitudinally through each of the reaction cylinders by an impeller arrangement similar to that described in connection with the drying cylinder 34. Each cylinder 206–210 is provided with a horizontal shaft 268 which extends axially through its cylinder and is supported for rotation by bearings 270 on the opposite end panel 170 and 172. The shafts 260 are driven by hydraulic motors 272 through a drive system including a pulley 274 on the output shaft of each motor, another pulley 276 carried on one end of each shaft 268, and a drive belt 278 drawn around the pulleys 274 and 276.

Each shaft 268 is provided with a plurality of radially extending arms 280, each of which carries a bucket 282 on its outer end. The buckets 282 are located adjacent to the inside surface of the cylinders in which they operate. Each bucket is open so that it can pick up materials and subsequently drop the materials as the bucket passes the top dead center position in the cylinder. The arms 280 and buckets 282 are arranged to convey materials axially along the length of each cylinder from its inlet end to its outlet end. As viewed in FIG. 5, the materials are conveyed from right to left in the upper cylinder 206 and in the lower cylinder 210. The materials are conveyed in the opposite direction of from left to right in the two intermediate cylinders 208. As shown in FIG. 8, the shafts 268 and the two intermediate cylinders 208 are rotated in opposite directions. As previously indicated in connection with the drying cylinder 34, the action of the arms 280 and buckets 282 agitates the materials simultaneously with their conveyance axially within the cylinders.

With particular reference to FIGS. 8 and 9, the lower cylinder 210 is provided with an arcuate manifold 284 which extends along the underside of cylinder 210 between the opposite end panels 170 and 172. A center compartment 286 is formed within the manifold 284 by a pair of spaced apart baffles 288 which are secured to panel 170 but are spaced slightly from the opposite panel 172. On each side of the center compartment 286, another pair of compartments 290 and 292 are formed on opposite sides of additional baffles 294 spaced outwardly from and parallel to baffles 288. Baffles 294 are each connected at one end with panel 172 but are spaced slightly from the opposite end panel 170. Process gas is delivered to the two outer compartments 290 through a pair of conduits 296 which connect with the manifold 284 at end panel 172. The opposite ends of the conduits 296 connect with the condensor unit 14 or with another source of process gas. The process gas is pressurized so that it is supplied through conduits 296 and into maniford 284 under pressure.

As best shown in FIG. 8, the center manifold compartment 286 is provided with a series of baffled slots 298 which admit the process gas to the bottom of the lower cylinder 210. Each slot 298 has an overlying baffle 300 which inhibits the entry of solid materials into the slots 298. As shown in FIG. 9, the slots 298 are spaced apart from one another along approximately one half the length of the center manifold compartment 286. The slots are located on that half of the manifold 284 located nearer to the end panel 170.

The lower cylinder 210 is provided with a process gas outlet 302 which is located at the top of the cylinder and which extends through end panel 172. The outlet 302 connects with a short pipe 304 which in turn connects with the center of a pipe 306 having its opposite ends connected with inlets 308 (FIG. 8) to a pair of manifolds 310 extending along the undersides of the two intermediate cylinders 208 between the end panels 170 and 172. Each manifold 310 has a series of baffled slots 312 which direct the process gas from the manifolds to the interiors of the reaction cylinders 208. Each slot 312 has an overlying baffle 314 which inhibits entry of solid materials into the slots 312. The slots 312 are spaced uniformly along the entire length of each manifold 310.

Each intermediate cylinder 308 has a gas outlet 316 (316) which extends through end panel 170 near the top of the cylinder. The gas outlets 316 connect with the opposite ends of a pipe 318 which connects at its center with a short pipe 320. The pipe 320 delivers process gas to a manifold 322 which extends along the underside of the upper cylinder 206 between end panels 170 and 72. An inlet 324 formed through panel 170 at one end of manifold 322 connects the manifold with pipe 320. Manifold 322 is provided with a series of baffled slots 326 which connect the interior of the manifold with the interior of cylinder 206. The slots 326 are spaced uniformly along the length of manifold 322 and are each provided with an overlying baffle 328. The baffles 328 inhibit the entry of solid materials into slots 326 in the manner described earlier.

The upper cylinder 206 has a process gas outlet 330 which extends through end panel 172 and which connects with a conduit 332 leading to the condensor 14. The outlet 330 is located near the top of cylinder 206. In the condensor 14, water and tar are removed from the process gas and the vapors are liquified. The dry gas is recovered and passed through a conduit 334 which leads from condensor 14 to a gas recovery unit (not shown).

OPERATION

In operation of the pyrolysis machine, fuel such as coal or another solid fuel is delivered through inclined conduit 30 and into the drying cylinder 24 through the inlet conduit 32. The fuel is conveyed along the length of cylinder 34 from the inlet end to the outlet end by the arms 34 and buckets 46 and is simultaneously agitated as it is conveyed in the drying cylinder. At the outlet end of cylinder 34, the fuel is discharged into hopper 48 through opening 50 and is then conveyed out of hopper 48 by the leveling auger 56. Auger 56 distributes the fuel along the length of the horizontal surface 54, and the fuel drops under the influence of gravity along both of the inclined surfaces 52. The leveling auger 56 assures that the fuel is distributed substantially uniformly along the length of each inclined surface 52.

The fuel which collects in the troughs 68 is conveyed out of the troughs by the transfer augers 70 and is conveyed by the augers through conduits 72 and into the pyrolysis unit 10. Augers 60 convey the fuel along the horizontal surfaces 184, and the fuel falls off of surfaces 184 and onto the inclined surfaces 186. The fuel is burned in the firebox 198 to generate heat which is applied to the reaction cylinders in order to heat the carbonizable materials that are contained therein.

The ashes which result from burning of the fuel in the firebox drop through the grate 190 and into the underlying ash trough 188. Auger 192 conveys the ashes out of the ash trough and delivers the ashes to suitable conveyers or other ash handling equipment which appropriately disposes of the ashes.

The combustion gases which result from burning of the fuel in firebox 198 pass through the outlet openings 202 and into the hoods 204 located on top of the housing 168. The gases pass through conduit 132 and into box 134 which splits the flow of combustion gases into two substantially equal streams which enter the two leg portions 134a and 134b of the box. The two streams enter the inlets 140 and 142 to the manifold 136 which underlies the drying cylinder 34. The gases are distributed throughout the manifold by the flow directing baffles 138 and are discharged from the manifold into cylinder 34 through the baffle slots 144.

The combustion gases which enter the drying cylinder 34 pass through the incoming solid fuel which is being conveyed and agitated in the drying cylinder. The passage of the hot combustion gases through the fuel acts to preheat and remove moisture from the fuel and also to filter the combustion gases. It is noted that the manner in which the fuel is agitated in cylinder 34 due to the agitating action provided by arms 44 and buckets 46 permits the combustion gases to intimately contact and mix with the fuels in order to enhance the drying of the fuel and filtering of the gases. At the same time, the baffles 146 inhibit entry of the solid fuel materials into the slots 144 while permitting the gases to flow freely through the slots to efficiently preheat and remove moisture from the fuel before it is conveyed into the pyrolysis unit 10.

The combustion gases are drawn out of the drying cylinder 34 through outlet 50 and flow out of hopper 48 to the area immediately above the fuel drying surface formed by the inclined panels 52 and the horizontal surface 54. The combustion gases are then drawn downwardly through the baffled openings 64 and through the fuel which is distributed relatively uniformly on the inclined panels 52. This passage of the combustion gases through the fuel on panels 52 further preheats and dries the fuel and further filters the combustion gases.

The carbonizable materials which are delivered to the feeder through conduits 82, 84 and 86 are distributed by leveling auger 92 along the length of surface 88. The feed materials fall along the inclined panels 90 under the influence of gravity in a substantially uniform distribution pattern. The combustion gases are drawn downwardly through the baffled slots 100 and thus through the carbonizable materials on the inclined panels 90. This preheats and removes moisture from the carbonizable materials and acts to additionally filter the combustion gases. The combustion gases are drawn through the carbon filter 154 into compartment 160 and then pass through conduit 162 and are discharged to the atmosphere through the exhaust stack 166. Fan 164 operates to draw the combustion gases along the flow path which results in the combustion gases passing through the drying cylinder 34 and through the inclined surfaces 52 and 90 and filter 154.

The uniform distribution of the baffled slots 64 and 100 on the inclined surfaces 52 and 90 causes the combustion gases to uniformly and intimately contact the fuel on panels 52 and the carbonizable materials on panels 90. This enhances the preheating and drying of the fuel and feed materials and also enhances the filtering of the combustion gases. The carbon filter 154 provides additional filtering of the combustion gases before they are discharged from the feeder unit through the stack 166.

After being preheated and dried on the inclined panels 90, the carbonizable material collects in the troughs 104 and is conveyed out of the troughs by augers 106. Augers 106 discharge the materials into the vertical conduits 116, and the materials are conveyed through the transverse conduits 118 by augers 120. Augers 120 deliver the materials to hopper 122, and the materials are then conveyed through the inclined conduit 124 by auger 126. The materials are directed through valve 130 and conduit 128 into the upper reaction cylinder 206.

Arms 280 and buckets 282 act to convey the carbonizable materials through the upper cylinder 206 from its inlet end to its outlet end while simultaneously agitating the materials. As the materials are moved through the upper cylinder 206, they are heated by the heat which is applied to cylinder 206 due to the burning of fuel in the firebox 198. In addition, the materials are further heated by the hot process gas which is introduced into the cylinder through the baffled slots 326, as will be described more fully.

At the outlet end of the upper cylinder 206, the carbonizable materials are discharged into hopper 216 through outlet 214. Auger 218 lifts the materials out of hopper 216 and through conduit 220 to the inclined chutes 232. The materials fall through the chutes under the influence of gravity to the inlet openings 234 which introduce the materials into the two intermediate cylinders 208. The arms 280 and buckets 282 in the intermediate cylinders convey the materials through the cylinders and simultaneously agitate the materials for more efficient heat transfer. In addition to the heat which is applied to cylinders 208 by the burning fuel, the carbonizable materials in cylinders 208 are heated by the process gas which is injected into the cylinders through the baffled slots 312.

When the materials have reached the outlet ends of cylinders 208, they are discharged into hopper 238 through the outlet openings 236. Auger 240 conveys the material from the hopper through conduit 242 and into the inclined chute 254 through which the materials fall into the lower cylinder 210 through inlet opening 256.

In the lower cylinder 210, the materials are conveyed and agitated by the arms 280 ad buckets 282 and are heated due to the burning fuel and also due to the hot gases which are injected through slots 298. The heating of the carbonizable materials in the cylinders 206–210 drives off useful gases such as methane and also produces vapors from the liquids which are contained in the materials. By the time the materials have passed through the lower or final cylinder 210, virtually all of the gases and vapors have been driven off and the materials have been reduced to virtually pure solid carbon residue. At the outlet end of cylinder 210, the solid residue is discharged through opening 258 and passes through conduits 260 and 262 to valve 264. After passing through the valve, the solid materials are conveyed through conduit 266 and thereafter processed in a suitable solids recovery system (not shown).

As the carbonizable materials are being conveyed through the reaction cylinders, process gas and/or vapor is applied to the bottom manifold 284 through conduits 296. The gas and/or vapor may be taken from the condensor 14 after the condensor has removed the water and tar content, and the gases which are injected through conduits 296 are compressed by a compressor (not shown) so that they are delivered to manifold 284 under pressure.

The process gas which enters manifold 284 flows through compartments 290 and around the ends of baffles 294 through compartments 292 before entering the center manifold compartment 286. This tortuous or serpentine flow path along which the process gas is directed by the baffles assures that the gas is well heated by the time it enters the center compartment 286. The process gas is discharged from manifold 284 through the baffled slots 298 located in the bottom of cylinder 210 but extending only approximately halfway along its length. As the carbonizable materials approach the outlet end of cylinder 210 located adjacent to end panel 172, only carbon remains, so the process gas is not injected into the cylinder near its outlet end. The heated process gas which enters cylinder 210 flows through and intimately contacts the carbonizable materials which are agitated within cylinder 210 in order to increase the efficiency of the heat transfer from the process gas to the carbonizable materials. The gas thereby further heats the materials to assure that they are thoroughly heated and reduced to substantially pure carbon.

The process gas which is injected into the lower cylinder 210 flows out of the lower cylinder through opening 302 along with the gas produced in the cylinder by the pyrolysis process. The gas then flows in opposite directions in pipe 306. The gas streams flowing in opposite directions in pipe 306 are substantially equal in volume and enter manifolds 310 through openings 308. The process gas is distributed along the length of the manifolds 310 and is discharged therefrom into the intermediate cylinders 308 through slots 312. The gas which is injected into cylinders 208 intimately contacts the carbonizable materials which are being conveyed and agitated therein in order to further heat the materials in the intermediate cylinders. Both the gas which is injected into cylinders 208 and the process gas which is driven off due to heating of the carbonizable materials in the cylinders pass through the outlets 316 and into pipe 318.

In pipe 318, the two gas streams are combined at pipe 320 and are directed into manifold 322 through opening 324. The process gas is directed from manifold 322 into the upper cylinder 206 through slots 326. The gas thus passes through the carbonizable materials in cylinder 206 in order to further heat the materials by direct contact therewith. The process gas is discharged from cylinder 206 through opening 330 and flows into conduit 332 and ultimately to the condensor 14. Water and tar are removed from the process gas in condensor 14, and the dry gas is recovered and piped out of the condensor to conduit 334.

It is pointed out that the material inlet to each reaction cylinder is located generally beneath the outlet of the immediately preceding cylinder or cylinders to facilitate the transfer of the process materials between the successive cylinders. The hopper and chute structures which form the transitions between the cylinder stages are arranged to efficiently move the carbonizable materials while preventing the process gas from flowing through the transition structures due to the presence of carbonizable materials. Therefore, all of the process gas can be directed into the cylinders in the intended manner and eventually recovered.

The method and apparatus of the present invention efficiently and effectively applies heat to the carbonizable materials in the reaction cylinders by reason of the materials being conveyed in succession through plural reactor vessels located at various levels or stages within the firebox 198. The materials are thus passed through the unit in a tortuous path and are constantly heated as they move along the path. The agitation of the materials as they are being conveyed adds to the effectiveness with which they are heated by radiation, conduction, and convection. Perhaps even more importantly, the passage of process gas through the cylinders and the materials therein results in direct thermal contact between the heated process gases and the carbonizable materials to further enhance the effectiveness of the heat transfer to the feed materials. In addition to or as an alternative to the burning of solid fuel, an oil or gas burner can be provided in the firebox.

Also important to the efficiency of the unit is the preheating and drying of both the fuel and carbonizable materials which takes place in the feeder 12. By preheating and drying the fuel with the combustion gases, the fuel is burned efficiently in the firebox and the heat is used more efficiently than occurs in other units. The use of both the drying cylinder 34 and the inclined surfaces 52 for drying and preheating of the fuel has been found to be a particularly effective technique for efficiently carrying out the drying and preheating process. Similarly, the use of the inclined panels 90 for drying and preheating of the carbonizable materials has proven to be particularly efficient. At the same time as the fuel and carbonizable materials are dried and preheated, the combustion gases are filtered, and the combustion gases are further filtered by the carbon filter 154 so that the emissions which eventually are discharged through the stack 166 are relatively clean.

It has been found that a wide variety of materials containing cellulose or oil can be used as the feed materials for the pyrolysis unit. Among the materials that can be used are wood waste, saw dust, wood chips, municipal waste, scrap tires, farm products of various types, ensilage, wild hay, manure and virtually any other material having a significant cellulose or oil content. An equally wide range of solid materials can be used to generate heat for carrying out the pyrolytic treatment.

The heat which is applied to the carbonizable materials within the reaction vessels by radiation, conduction and convection reduces the materials to a solid residue which is substantially pure carbon in the form of charcoal. Virtually all of the useful liquids and gases are driven off by the pyrolysis treatment, and liquid hydrocarbons and other liquid fuels are driven off in the form of vapors which can be recovered and separated from the gases which are driven off.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for the pyrolytic treatment of carbonizable materials, said apparatus comprising:

a housing presenting a combustion chamber therein for the burning of fuel to generate heat for the pyrolytic treatment of the carbonizable materials;

upper and lower reaction vessels supported to extend generally horizontal and parallel to one another in said housing for heating of the contents of the vessels when fuel is burned in said combustion chamber, each reaction vessel having opposite inlet and outlet ends with the outlet end of the upper vessel located generally above the inlet end of the lower vessel;

means for introducing carbonizable materials into said upper vessel through the inlet end thereof;

means for conveying the materials through said upper vessel from the inlet end to the outlet end while simultaneously agitating the materials, whereby the heat applied to the materials in the upper vessel drives off gases therefrom and leaves solid residue;

means for transferring the materials from the outlet end of the upper vessel to the inlet end of the lower vessel;

means for conveying the materials through said lower vessel from the inlet end to the outlet end while simultaneously agitating the materials;

means for discharging the solid residue from the outlet end of said lower vessel;

an enclosed manifold generally underlying said upper reaction vessel and extending substantially the entire length thereof, said manifold closed to combustion gases generated in said combustion chamber when fuel is burned therein;

conduit means for directing the hot gases driven off in said lower vessel into said manifold;

a plurality of passages providing communication between said manifold and said upper reaction vessel to permit the hot gases to flow into said upper vessel from the manifold, said passages being arranged to inhibit the passage of solid materials from the upper vessel into the manifold and said passages being spaced substantially uniformly along the length of the upper vessel to introduce the hot gases into the upper vessel in a generally uniform pattern of distribution along the length thereof for further heating of the carbonizable materials in the upper vessel; and a gas discharge line connected with said upper vessel to receive the gases driven off from the carbonizable materials in said upper and lower vessels.

2. Apparatus as set forth in claim 1, including:

a second enclosed manifold generally underlying said lower reaction vessel;

conduit means for directing gases into said second manifold for heating therein; and a plurality of passages between said second manifold and said lower reaction vessel to permit the heated gases to flow into said lower vessel from the second manifold for further heating of the carbonizable materials in the lower vessel.

3. Apparatus as set forth in claim 2, wherein said second manifold includes:

a pair of manifold chambers separated from one another and each receiving a stream of the heated gases;

baffle means in each manifold chamber arranged to direct the gas stream therein back and forth lengthwise of the chamber for heating of the gas stream; and a discharge chamber in the second manifold for combining the gas streams from the manifold chambers, said passages between said second manifold and said lower reaction vessel extending from said discharge chamber.

4. Apparatus as set forth in claim 1, including:

a slot for each passage forming an entry way for the hot gases into the upper reaction vessel; and a baffle generally overlying each slot to inhibit entry of solid materials into the slot but permitting flow of hot gases through the slot.

5. Apparatus as set forth in claim 1, including:

a feeder housing spaced from the first mentioned housing;

a generally horizontal drying vessel in said feeder housing having an inlet end and an outlet end;

means for introducing the fuel to be burned in said combustion chamber into said drying vessel through the inlet end thereof;

means for conveying the fuel through said drying vessel from the inlet end to the outlet end thereof while simultaneously agitating the fuel;

means for conveying the fuel from the outlet end of said drying vessel to said combustion chamber for burning therein;

an exhaust outlet from the combustion chamber for receiving the combustion gases resulting from burning of the fuel;

a combustion gas manifold underlying said drying vessel and extending substantially the entire length thereof;

conduit means for directing the combustion gases from said exhaust outlet into said combustion gas manifold;

a plurality of passages providing communication between said combustion gas manifold and said drying vessel to direct the combustion gases into said drying vessel from the manifold to remove moisture from the fuel and effect filtering of the combustion gases; and an exhaust conduit communicating with said drying vessel to receive the combustion gases and discharge same from the feeder housing.

6. Apparatus as set forth in claim 5, wherein said means for conveying the fuel from the outlet of said drying vessel to said combustion chamber includes:

an inclined surface supported in the feeder housing generally beneath the drying vessel, said surface having an upper end and a lower end;

means for distributing the fuel from the discharge end of said drying vessel along said upper end of the inclined surface, whereby the fuel drops along said surface from the upper end thereof to the lower end thereof under the influence of gravity; and means for conveying the fuel from the lower end of said surface to said combustion chamber, said inclined surface being interposed between said drying vessel and said exhaust conduit in the path of the combustion gases flowing therebetween and said surface being perforated to accommodate flow of combustion gases therethrough and through the fuel on said surface for further removal of moisture from the fuel and further filtering of the combustion gases.

7. Apparatus as set forth in claim 6, including:

a slanted surface in said feeder housing have an upper end and a lower end, said slanted surface being interposed between said drying vessel and said exhaust conduit in the path of the combustion gases flowing therebetween;

means for introducing the carbonizable materials into said feeder housing and distributing the carbonizable materials along the upper end of said slanted surface, whereby the carbonizable materials drop along said slanted surface from the upper end thereof to the lower end thereof;

said means for introducing carbonizable materials into said upper vessel comprising means for conveying the materials from the lower end of said slanted surface to the inlet end of said upper vessel; and a plurality of perforations in said slanted surface to accommodate flow of combustion gases therethrough and through the carbonizable materials on said slanted surface to preheat and remove moisture from the carbonizable material and to further filter the combustion gases.

8. Apparatus for the pyrolytic treatment of carbonizable material, said apparatus comprising:

a housing presenting a combustion chamber for the burning of fuel to generate heat;

an upper reaction vessel in said housing having a generally horizontal orientation and opposite inlet and outlet ends;

a pair of intermediate reaction vessels in said housing each having a generally horizontal orientation and opposite inlet and outlet ends, said intermediate vessels being arranged generally side by side at a level below the upper vessel with the inlet ends of the intermediate vessels generally underlying the outlet end of said upper vessel;

a lower reaction vessel in the housing having a generally horizontal orientation and opposite inlet and outlet ends, said lower vessel being located at a level below the intermediate vessels with the inlet end of the lower vessel generally underlying the outlet ends of the intermediate vessels;

means for introducing carbonizable materials into the inlet end of said upper vessel;

means for conveying carbonizable materials through each reaction vessel from the inlet end to the outlet end thereof while simultaneously agitating the materials in the vessels, whereby the heat applied to the vessels when fuel is burned in said combustion chamber drives off gases from the carbonizable materials and leaves said residue;

means for receiving the carbonizable materials at the outlet end of the upper vessel and distributing the materials in substantially equal amounts to the inlet ends of the intermediate vessels;

means for receiving the carbonizable materials at the outlet ends of the intermediate vessels and combining the materials from said outlet ends for application to the inlet end of said lower vessel;

means for directing the hot gases driven off from the carbonizable materials in said lower vessel through the carbonizable materials in said intermediate vessels to effect further heating of the materials in said intermediate vessels;

means for directing the hot gases driven off from the carbonizable materials in said intermediate vessels through the carbonizable materials in said upper vessel to effect further heating of the materials in said upper vessel, said means for directing the hot gases comprising a manifold generally underlying each of the intermediate vessels, means for directing the hot gases from said lower vessel to said manifolds in substantially equal amounts, a plurality of openings providing communication between each manifold and the corresponding intermediate vessel, said openings being arranged to permit flow of hot gases into the intermediate vessels and to inhibit passage of solid materials into the manifolds, an upper manifold generally underlying said upper vessel, means for directing the hot gases from each intermediate vessel to said upper manifold, a plurality of openings providing communication between said upper manifold and upper vessels, said openings being arranged to permit flow of hot gases into the upper vessel and to inhibit passage of solid materials into the upper manifold; and a gas discharge line communicating with said upper reaction vessel for receiving the hot gases driven off from the materials in said vessels.

9. The invention of claim 8, wherein said openings are spaced substantially uniformly along the length of each intermediate vessel and said upper vessel to distribute the hot gases substantially uniformly along the lengths of said intermediate and upper vessels.

10. The invention of claim 8, wherein each opening is in the form of a slot opening into the corresponding reaction vessel and each slot has an inclined baffle overlying same to inhibit entry of solid materials into the slot.

11. The invention of claim 8, including:

a feeder housing spaced from the first mentioned housing, said feeder housing presenting a first drying zone for drying of the fuel and a second drying zone for drying of the carbonizable materials;

means for conveying the fuel through said first drying zone and then to said combustion chamber;

means for conveying the carbonizable materials through said second drying zone and then to the inlet end of said upper reaction vessel;

an exhaust outlet from the combustion chamber for receiving the combustion gases resulting from burning of the fuel;

means for passing the combustion gases from said exhaust outlet through said first and second drying zones and the materials therein to remove moisture from the fuel and carbonizable materials and to effect filtering of the combustion gases; and an exhaust conduit for receiving the combustion gases and discharging same from the feeder housing.

12. Apparatus for burning solid fuel and using the heat generated thereby for the pyrolytic treatment of carbonizable materials, said apparatus comprising:

a firebox having at least one enclosed reaction vessel therein for receiving the carbonizable materials, said firebox having an inlet for receiving the solid fuel to be burned therein and said vessel having opposite inlet and outlet ends;

a feeder housing having separate first and second drying zones for drying of the fuel and the carbonizable materials, respectively;

fuel conveying means for conveying the solid fuel through said first drying zone and then into said firebox through the inlet thereof for burning in the firebox;

carbonizable material conveying means for conveying the carbonizable materials through said second drying zone and then into said reaction vessel through the inlet end thereof;

means in said vessel for conveying the carbonizable materials therein between said inlet and outlet ends, whereby the heat applied to said vessel from burning of the fuel in said firebox drives off process gas from the carbonizable materials and leaves solid residue;

means for collecting the solid residue;

an exhaust outlet from said firebox for receiving the combustion gases resulting from burning of the fuel;

means for effecting flow of the combustion gases from said exhaust outlet through said first and second drying zones and the materials therein to remove moisture from the solid fuel and carbonizable materials and to effect filtering of the combustion gases; and an exhaust conduit for said feeder housing communicating with said first and second drying zones to receive the combustion gases and discharge same from the feeder housing.

13. Apparatus as set forth in claim 12, wherein:

said first drying zone includes a generally horizontally oriented drying vessel having inlet and outlet ends and a fuel drying surface having a crest and a pair of inclined panels sloping outwardly and downwardly from opposite sides of said crest, each panel having a lower end and a plurality of openings arranged to accommodate flow of the combustion gases therethrough but inhibiting the passage of the solid fuel therethrough; and said fuel conveying means includes means for conveying the fuel through said drying vessel from the inlet end to the outlet end thereof and means for distributing the fuel from the outlet end of said drying vessel along said crest of said fuel drying surface whereby the fuel falls from said crest along said inclined panels to the lower ends thereof under the influence of gravity, said fuel conveying means further including means for receiving the fuel at the lower ends of said inclined panels and conveying the fuel therefrom into said firebox inlet.

14. Apparatus as set forth in claim 13, wherein said flow effecting means includes:

a manifold located adjacent said drying vessel;

means for applying the combustion gases from said exhaust outlet to said manifold;

a plurality of openings providing communication between said manifold and drying vessel, said openings being arranged to accommodate flow of the combustion gases therethrough from the manifold into the drying vessel but inhibiting the passage of solid fuel from the drying vessel into the manifold; and means for passing the combustion gases through said openings in the inclined panels.

15. Apparatus as set forth in claim 13, wherein:

said second drying zone includes a carbonizable material drying surface having a crest and a pair of inclined panels sloping outwardly and downwardly from opposite sides of said crest, each panel having a lower end and a plurality of openings arranged to accommodate flow of the combustion gases therethrough but inhibiting the passage of the solid fuel therethrough;

said material conveying means includes means for distributing the carbonizable materials along said crest of the material drying surface whereby the materials fall along said inclined panels to the lower ends thereof under the influence of gravity and means for conveying the carbonizable materials from said lower ends of the inclined panels to said inlet end of said reaction vessels; and said flow effecting means includes means for effecting flow of the combustion gases through said drying vessel and through the openings in said inclined panels of the fuel drying surface and the material drying surface.

* * * * *